Patented Dec. 16, 1941

2,266,104

UNITED STATES PATENT OFFICE 2,266,104

PREPARATION OF CARBON BLACK

Max R. Vogel, Easton, Pa., and John W. Snyder, Scotch Plains Township, Union County, N. J., assignors to Binney and Smith Company, New York, N. Y., a corporation of New Jersey No Drawing. Application February 24, 1940, Serial No. 320,686

12 Claims. (Cl. 106—307)

This invention relates to the treatment of carbon black for use as a pigment in the preparation of liquid coating compositions such as enamels, paints, inks and the like.

An important object of the invention is to provide a specially treated form of carbon black adapted to be introduced, either directly or indirectly, into liquid coating compositions of the oil or resin type containing drying compounds—such as compounds containing the common "drier metals," manganese, cobalt, and lead or naturally occurring drying compounds—an important feature of the invention residing in the fact that the treated carbon black serves in its full capacity as a pigment without seriously retarding the drying rate or the drying stability of such coating compositions.

The invention also aims to provide a method of treating carbon black, and also to provide a coating composition of the oil or resin type including such treated carbon black as an ingredient.

In the preparation of liquid coating compositions of the oil or resin type it is common knowledge that when carbon black is used as the pigmenting agent such compositions require high percentages of drying compounds, and that in many cases, even with this increase in drying compounds, a longer time is required for drying than when most other pigments are employed. This is believed to be largely due to the highly active nature of the carbon black particles and also to the affinity of the carbon black contained in the coating composition for the drier metals. Thus, when carbon black is introduced into the coating composition, portions of the drier metals are attracted by the carbon black particles and are rendered ineffective. Attempts have been made to compensate for this phenomenon by increasing the drier metal content. This has been partly successful as regards accelerating the drying rates of freshly made enamels. However, as such enamels age the drier metals appear to lose their efficacy and eventually reach a stage where the enamels become unusable. On the other hand, if sufficient drier metals are added initially to produce a satisfactory drying effect after aging for a suitable period, there is then likely to be too much drier present to permit the use of the enamel with good results when freshly made. It is common practice to overload carbon black enamels with drier metals, and when such an enamel is sent out from the factory it is with the expectation that it will remain on the dealer's shelves and age before use. This, however, involves an element of uncertainty and, furthermore, the addition of excess drying metals is objectionable for the reason that this adversely affects the film durability and other physical characteristics of the enamel.

In accordance with the present invention it is proposed to treat the carbon black prior to its introduction into the liquid coating composition so as to make possible black enamels of improved drying characteristics. This treatment involves wetting the carbon black with an aqueous solution of a compound, the character of which will be more particularly described later, and then removing excess moisture from the carbon black.

Carbon black particles are of very small diameter, ranging from 60 millimicrons for the coarsest type to less than 25 millimicrons for the finer types. Because of this extreme fineness, a small amount of carbon black, in bulk, presents a very large surface; for example, one pound of a fine grade of carbon black will have a surface area of more than 15 acres. Each unit of surface has highly adsorptive properties which, multiplied by the total area of the surface, render carbon blacks very active. It is a purpose of this invention to inactivate such surface, as far as its effects upon the drying of coating compositions is concerned, this result being accomplished by means of certain inactivating compounds, hereinafter referred to as inactivators. Among such inactivators, all water soluble, which have been found to be particularly effective are ferric chloride, potassium dichromate, cobalt acetate, cobaltous nitrate, basic lead acetate, calcium chromate, chromium trioxide, ammonium dichromate, calcium nitrate and barium hydrate. Other inactivators that have proven satisfactory are included in the table "Carbon black pigmented enamels," further on.

One example of the process by which the invention was carried out is as follows: Approximately 300 grams of carbon black was wetted by 700 grams of water in which was dissolved one of the inactivators mentioned above. Following this wetting, the resulting mass was gently agitated until the carbon black assumed the form of small beads, or pellets, and then dried to a moisture content of two per cent or less. One type of apparatus for producing such beads is described in the patent of Herman Jacob Glaxner, No. 2,065,371, granted December 22, 1936.

The carbon black beads were then mixed with "Glyptal Solution No. 2458" (a synthetic resin solution containing 50 per cent solids), in the approximate proportion of 90 grams of glyptal solution to 16.5 grams of carbon black (the actual weight of treated carbon black in these experiments varying according to the amount of added treating material). The carbon black and glyptal solution were then ground into a paste on a three-roll mill so as to obtain a thorough dispersion of the carbon black in the resin solution. An enamel was prepared from the glyptal-carbon black paste according to the following formula:

| | Parts by weight, grams |
|---|---|
| Glyptal-carbon black paste | 45.0 |
| Resin solution (60% solids) | 202.0 |
| Petroleum hydrocarbon derivative | 40.0 |
| Toluene | 40.0 |
| Drier | 2.6 |

The petroleum hydrocarbon derivative was of the type sold under the trade name of "Solvesso No. 2." The drier containing 9.7% metal was prepared as follows:

| | Parts by weight, grams |
|---|---|
| Manganese naphthenate, 6% Mn | 100 |
| Cobalt naphthenate, 6% Co | 171 |
| Lead naphthenate, 24% Pb | 72 |

In order to determine the comparative effectiveness of various inactivators, numerous specimen enamels were prepared according to the above formula, using different inactivators for the treatment of the carbon black. In addition to such specimen enamels, a clear control—that is a control containing all the ingredients except a pigment—was included in each test group. The drying time for the treated and untreated carbon black pigmented enamels of each group was calculated against the clear control for that group. The results were expressed as index factors; for example, the inactivator used in the treatment of the pigment of an enamel which required 1.22 times as long to dry as the clear (unpigmented) control enamel of the group was accorded a drying index factor of 122. That is, all drying times were calculated on the basis of "per cent of clear control" and in this way inconsistencies due to varying atmospheric conditions were eliminated. All experimental enamels and clear controls were tested when freshly made and once every two weeks for a period of 16 weeks. In the following table, each of the "Drying index factors" represents the average for the nine tests made during the 16 weeks and expressed the per cent of clear control drying time required for the specimen enamel. As an example, it will be noted that the enamel made with untreated carbon black and designated "the control enamel," has a drying index factor of 172%, which means that it required 1.72 times as long to dry as did the clear control enamel. All of the treated carbon blacks show values substantially lower than that of the untreated carbon black, and, therefore, indicate improved drying characteristics. It will be noted that in the case of ferric chloride, for example, the drying index factor is less than 100, which means that enamels containing a carbon black pigment which had been treated with this particular inactivator dried even faster than did the clear control.

Carbon black pigmented enamels

| Parts inactivator per 100 parts carbon black | | Drying index factor |
|---|---|---|
| 00.0 | The control enamel (untreated carbon black pigment) | 172 |
| 16.7 | Ferric chloride | 66 |
| 18.2 | Cobaltous nitrate | 93 |
| 10.0 | Potassium dichromate | 104 |
| 10.0 | Cobalt acetate | 106 |
| 12.0 | Calcium chromate | 122 |
| 19.8 | Barium hydrate | 126 |
| 6.3 | Chromium trioxide | 127 |
| 10.0 | Ammonium dichromate | 130 |
| 10.3 | Calcium nitrate | 134 |
| 5.0 | Ammonium nitrate | 135 |
| 10.0 | Basic lead acetate | 136 |
| 6.3 | Potassium nitrate | 137 |
| 17.5 | Cobaltous sulphate | 138 |
| 12.1 | Potassium chromate | 146 |
| 20.7 | Lead nitrate | 153 |
| 11.8 | Copper acetate | 153 |
| 24.5 | Chromic sulphate | 159 |
| 9.6 | Sodium perborate | 165 |
| 13.7 | Zinc acetate | 168 |
| 11.9 | Ferric acetate | 170 |

Some inactivators produced the desired effect immediately, while others required a contact period of a week or longer to complete the reaction. The above inactivators are all soluble in water and their manner of application to the carbon black, except for differences in the concentration of the solutions found to give optimum results, is substantially the same.

While the exact reactions involved by the use of inactivators have not been definitely established, we do know that the surface of carbon black particles is highly active in adsorptive power and chemical reactivity. It is this activity which is responsible for poor drying behavior generally, and it is known that drying retardation varies directly as the degree of activity of a carbon black. Untreated, active carbon black will interfere with the normal drying of an oil or resinous film by adsorbing a large part of both the added metallic compounds and the organic driers naturally present in the vehicle. Such carbon black will also affect the vehicle and driers chemically in such a way as to produce drying retardation. By the present invention this activity is reduced by a process which is partly physical and partly chemical. By simple deposition or chemical decomposition on the carbon black surface, these inactivators reduce or destroy the adsorptive affinity of this surface for drier compounds and so alter the chemical nature of this surface that its deleterious effect on drying is either reduced or completely eliminated. It is therefore important that for a compound to be classed as an inactivator it should react favorably, both physically and chemically, with the carbon black. The drying retardation of carbon black is a conjoint action and must be dealt with accordingly, with due regard for both chemical and physical action of the carbon black so far as it affects its adsorptive power.

It seems reasonable to suppose that carbon black has a preferential affinity for the inactivator or its reaction products over the oil soluble drier compounds, added or natural. And that this action is a selective one is indicated by the fact that there is considerable variation between the effectiveness of the various inactivators, and also by the fact that some compounds, and certain compounds of the drier metals that might be expected to give beneficial results, are inoperative. Thus, calcium acid phosphate, and zinc sulphate actually retard the drying of coating compositions containing carbon black as a pigment, while other compounds, such as nickel sulphate, may be classed as indifferent so far as present investigation shows.

While little work has been done to explain what actually occurs when an oxidizing compound like potassium dichromate is adsorbed on carbon black, there is evidence to believe that the salt undergoes some decomposition. This decomposition probably deposits an insoluble residue on the carbon black surface which reduces its activity. The use of water-soluble drier metal compounds is not to be considered mere drier preloading, for the reason that the amount of a compound which has been found effective as an inactivator does not produce an equivalent drying effect when dispersed in an enamel with untreated carbon black. In any event it appears logical to assume, judged upon the basis of present investigations, that compounds which bring about improved drying characteristics in carbon black pigmented coating compositions, first, must be of the type for which carbon black has a pronounced affinity, and second, must either decompose or be fixed upon the surface of the carbon black in such manner as to prevent their dislodgment when the carbon black is ground into the liquid vehicle.

While the particular coating composition selected as an example in the foregoing description is an enamel, it is to be expected, and experiment has confirmed the fact, that the inactivators are equally efficacious for other classes of liquid coating compositions, such as paints, inks, etc., in which oil or a resin, or a combination of both, forms the vehicle for the carbon black pigment and drier metals.

Coating compositions produced from treated carbon black as described above are in many cases superior in physical characteristics—gloss, depth of color, stability and durability—to coating compositions in which untreated carbon black is used as the pigmenting agent.

We are aware of the patents of William B. Wiegand, Nos. 2,178,382 and 2,178,383, both granted October 31, 1939, relating to the treatment of carbon black and lamp black with a compound designed to modify the pH of these blacks and thereby increase their dispersion properties.

The present invention is not to be restricted to any specific proportions or manner of procedure beyond the limitation of the appended claims.

We claim:

1. The method of treating carbon black for use as a pigment in coating compositions included within the class consisting of oils and resins and containing a drier compound which comprises applying to the carbon black an aqueous solution of an inactivating compound for rendering the carbon black less reactive with respect to the drier compound, said inactivating compound being selected from the group of water-soluble acetates of the polyvalent metals of the class consisting of ferric acetate, cobalt acetate, copper acetate, and basic lead acetate.

2. The method of treating carbon black for use as a pigment in coating compositions included within the class consisting of oils and resins and containing a drier compound, which method comprises applying to the carbon black an aqueous solution of cobalt acetate, and then drying the carbon black.

3. A carbon black pigment for coating compositions included within the class consisting of oils and resins and containing a drier compound, said carbon black having a surface film of a water-soluble inactivating compound for rendering the carbon black less reactive with respect to the drier compound, said inactivating compound being selected from the group consisting of water-soluble acetates of the polyvalent metals of the class consisting of ferric acetate, cobalt acetate, copper acetate, and basic lead acetate.

4. A carbon black pigment for coating compositions included within the class consisting of oils and resins and containing a drier compound, said carbon black having a surface film of cobalt acetate.

5. A liquid coating composition of the organic vehicle type containing carbon black as a pigmenting agent and a drier compound, the carbon black having a surface film of a water-soluble inactivating compound for rendering the carbon black less reactive with respect to said drier compound, said inactivating compound being selected from the group of water-soluble acetates of the polyvalent metals of the class consisting of ferric acetate, cobalt acetate, copper acetate, and basic lead acetate.

6. A liquid coating composition of the organic vehicle type containing carbon black as a pigmenting agent and a drier compound, the carbon black having a surface film of cobalt acetate.

7. The method of treating carbon black for use as a pigment in coating compositions included within the class consisting of oils and resins and containing a drier compound, which method comprises applying to the carbon black an aqueous solution of basic lead acetate.

8. The method of treating carbon black for use as a pigment in coating compositions included within the class consisting of oils and resins and containing a drier compound, which method comprises applying to the carbon black an aqueous solution of ferric acetate.

9. A carbon black pigment for coating compositions included within the class consisting of oils and resins and containing a drier compound, said carbon black having a surface film of basic lead acetate.

10. A carbon black pigment for coating compositions included within the class consisting of oils and resins and containing a drier compound, said carbon black having a surface film of ferric acetate.

11. A liquid coating composition of the organic vehicle type containing carbon black as a pigmenting agent and a drier compound, the carbon black having a surface film of basic lead acetate.

12. A liquid coating composition of the organic vehicle type containing a carbon black as a pigmenting agent and a drier compound, the carbon black having a surface film of ferric acetate.

MAX R. VOGEL.
JOHN W. SNYDER.